United States Patent [19]

Sami et al.

[11] 4,423,713
[45] Jan. 3, 1984

[54] ELECTRIC CONTROL APPARATUS FOR A FUEL INJECTION PUMP

[75] Inventors: Hiroshi Sami, Susono; Tatehito Ueda, Numazu; Osamu Ito, Toyota; Nobuhito Hobo, Inuyama; Takashi Naitou, Oobu; Tetsuya Nakamura, Chiryu; Shizuo Kawai, Kariya; Yukinori Miyata, Oobu, all of Japan

[73] Assignees: Nippondenso Co., Ltd., Kariya; Toyota Jidosha Kogyo Kabushiki Kaisha, Toyota, both of Japan

[21] Appl. No.: 146,369

[22] Filed: May 2, 1980

[30] Foreign Application Priority Data

Jul. 10, 1979 [JP] Japan .............................. 54-87884

[51] Int. Cl.³ .................... F02D 5/00; F02M 59/20
[52] U.S. Cl. .................................... 123/357; 123/480
[58] Field of Search ............... 123/357, 358, 359, 478, 123/480, 486, 487; 364/431

[56] References Cited

U.S. PATENT DOCUMENTS 3,903,852  9/1975  Sola .................................... 123/357
4,223,654  9/1980  Wessel et al. ...................... 123/358
4,357,920  11/1982  Stumpp et al. ..................... 123/446
4,359,991  11/1982  Stumpp et al. ..................... 123/478
4,379,332  4/1983  Busser et al. .................. 123/480 X

FOREIGN PATENT DOCUMENTS 2030729  4/1980  United Kingdom ............... 123/478

Primary Examiner—Tony M. Argenbright
Attorney, Agent, or Firm—Cushman, Darby & Cushman

[57] ABSTRACT

The intake pressure and temperature of a Diesel engine equipped with a supercharger are sensed and the sensed intake pressure value is divided by the sensed intake temperature value to obtain an intake density. A value indicative of the intake density is divided by a value indicative of the air-excess ratio computed in accordance with the operating condition of the engine producing a smoke-limit injection amount. The smoke-limit injection amount is compared with the injection amount corresponding to a part-load condition of the engine and the smaller one of the values is applied to a linear solenoid for controlling the fuel injection amount adjusting member in the fuel injection pump of the engine.

7 Claims, 18 Drawing Figures

ELECTRIC CONTROL APPARATUS FOR A FUEL INJECTION PUMP

BACKGROUND OF THE INVENTION

This invention relates to an electric control apparatus for fuel injection pumps which is designed so that the operating conditions of a Diesel engine equipped with a supercharger are detected to generate electric signals whereby the intake density and the air-excess ratio are computed by electric computing means and the amount of smoke-limit fuel injection to the engine is controlled according to the results of the computations.

When a supercharger is installed on a Diesel engine, the density of the air taken into the cylinders on the intake stroke of the engine increases with the results that the amount of smoke-limit fuel injection is increased and the output torque of the engine is increased. While the air in the intake manifold of a supercharged engine generally increases in both pressure and temperature and thus an inter-cooler or the like is provided as a means of decreasing the air temperature, the temperature of the intake air still rises considerably. Consequently, variations in the intake density due to the temperature rise are also not negligible so that it is impossible to detect the exact amount of air drawn into the engine, unless both the absolute pressure and temperature in the intake manifold are detected simultaneously and the density of the air in the intake manifold is computed. The amount of air drawn into the engine on each intake stroke is practically determined by the cylinder volume and the intake air density and a so-called smoke-limit fuel injection amount is determined in consideration of a predetermined air-excess ratio.

In a known type of supercharged engine, the intake manifold pressure is applied to a bellows or the like, balanced with the force of a return spring and converted into a displacement so as to actuate the injection amount adjusting member of the fuel injection pump and thereby control the smoke-limit injection amount. This known apparatus is disadvantageous in that although the pressure compensation is provided, no compensation is provided for the effect of variations in the intake air temperature so that the intake air density is not compensated for variations in the intake temperature and the smoke-limit control cannot be accomplished accurately, thus making it impossible to ensure a satisfactory supercharging effect.

SUMMARY OF THE INVENTION

With a view to overcoming the foregoing deficiencies in the prior art, it is the object of the present invention to provide an electric control apparatus for fuel injection pumps which is capable of performing a highly accurate smoke-limit control.

The above and other objects of this invention can be accomplished by providing an electric control apparatus for fuel injection pumps, wherein the pressure in the intake manifold of an engine is sensed by an intake pressure sensor to generate an electric signal and the temperature of the intake air is sensed by an intake temperature sensor to generate an electric signal to thereby compute the density of the intake air by intake density computing means, while the air-excess ratio or the ratio of the actual air-fuel ratio of the mixture to the stoichiometric air-fuel ratio is computed in accordance with the engine operating conditions, whereby a computational operation is performed on the computed intake density and air-excess ratio to compute a target value for the smoke-limit injection amount and thereby to control the smoke-limit injection amount.

Thus the invention has among its great advantages the fact that since the smoke-limit amount of fuel to be supplied to an engine is determined in accordance with the computed intake density and air-excess ratio, the smoke-limit injection amount can be controlled with a high degree of accuracy with the result that the supercharging effect can be fully utilized and the engine power output can be increased satisfactorily while fairly reducing the amount of smoke in the exhaust gases, thus allowing the apparatus to lend itself to be useful as an engine exhaust emission control measure and also ensuring a satisfactory result as a resource-saving measure by virtue of the reduced size of the apparatus due to the increased power output.

DESCRIPTION OF THE PREFERRED EMBODIMENTS

Figure 1:
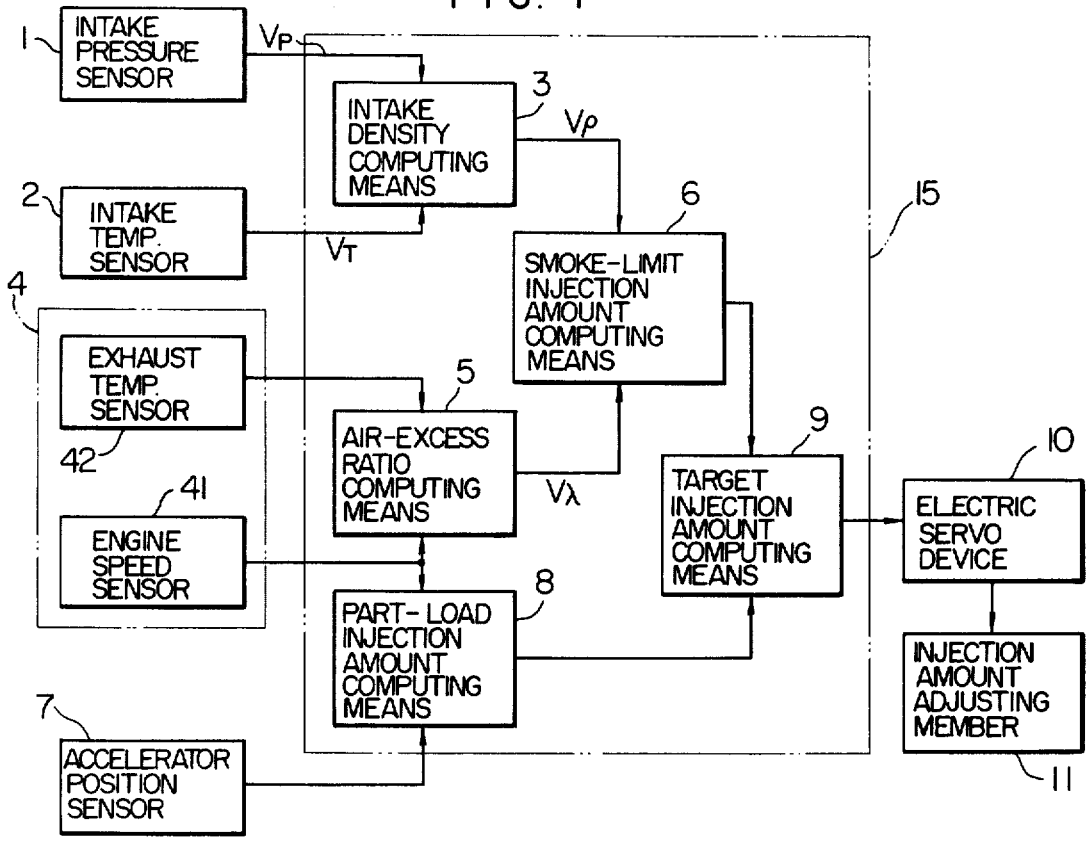
FIG. 1 is a block diagram showing the construction of an embodiment of the present invention.

The present invention will now be described in greater detail with reference to its embodiments illustrated in the drawings. In FIG. 1 showing the construction of one embodiment, numeral 1 designates an intake pressure sensor for sensing the absolute pressure in the intake manifold of an engine, 2 an intake temperature sensor for sensing the temperature in the intake manifold, 3 intake density computing means for computing the density of the intake air by dividing the sensed intake pressure value by the sensed intake temperature value, and 4 operating condition sensing means comprising in this embodiment an engine speed sensor 41 and an exhaust temperature sensor 42. Numeral 5 designates air-excess ratio computing means, 6 smoke-limit injection amount computing means, 7 an accelerator position sensor, 8 part-load injection amount computing means, 9 target injection amount computing means, 10 an electric servo device, and 11 an injection amount adjusting member. A block 15 enclosed by a two-dotted chain line forms electric computing means (ECU).

The intake pressure sensor 1 and the intake temperature sensor 2 respectively generate an intake pressure signal $V_p$ and an intake temperature signal $V_T$ in response to the absolute pressure Pi and the temperature Ti of the air in the intake manifold. The intake density computing means 3 receives the intake pressure signal $V_p$ and the intake temperature signal $V_T$ to divide the value of the intake pressure signal $V_p$ by the value of the intake temperature signal $V_T$ and thereby to generate an intake density signal $V_\rho$ corresponding to the density $\rho$ of the air in the intake manifold. The intake density $\rho$ is given by $\rho = k_1 Pi/Ti$ (where $k_1$ is a constant), and if the piston displacement is represented by $Q_a$, the amount of intake air Ga on each engine intake stroke is given by $Ga = \eta \cdot \rho \cdot Q_a$ (where $\eta$ is the suction efficiency).

The operating condition sensing means 4 senses the required engine operating conditions for attaining a predetermined air-excess ratio. In this embodiment, the engine speed sensor 41 senses an engine speed signal corresponding to the rotational speed of the engine crankshaft and the exhaust temperature sensor 42 mounted in the exhaust pipe senses an exhaust temperature signal corresponding to the engine exhaust temperature, thereby generating heat load signals indicative of the heat load of the engine. The air-excess ratio computing means 5 receives the detection signals from the operating condition sensing means 4 to compute an air-excess ratio signal $V_\lambda$ corresponding to the air-excess ration $\lambda$. The smoke-limit injection amount computing means 6 receives the intake density signal $V_\rho$ and the air-excess ratio signal $V_\lambda$ to compute an injection amount limit value which satisfies the smoke-limit. The accelerator position sensor 7 senses the amount of movement of the engine accelerator lever or accelerator pedal. The part-load injection amount computing means 8 receives the engine speed signal from the engine speed sensor 41 and the accelerator position signal from the accelerator position sensor 7 as the engine operating condition to electrically compute a part-load injection amount signal which is indicative of the injection amount required under the part-load condition of the engine. The target injection amount computing means 9 receives the smoke-limit injection amount signal from the smoke-limit injection amount computing means 6 and the part-load injection amount signal from the part-load injection amount computing means 8 so that one of the signals indicative of the smaller injection amount is electrically computed or selected as a target injection amount signal which determines a target value for the injection amount of the injection pump. The electric servo device 10 is responsive to the target injection amount signal generated from the target injection amount computing means to actuate an injection amount adjusting member 11 so as to correct the error in the actual injection amount of the injection pump. The injection amount adjusting member 11 is one which adjusts the amount of fuel injected by the injection pump and it corresponds for example to the fuel control rack in the Bosch multi-plunger or inline type injection pump or to the spill ring in the case of the Bosch distribution type pump. The injection amount is adjustable in accordance with the position of the injection amount adjusting member 11, and the adjusting member 11 is linked to the electric servo device 10 so as to be operated thereby.

Figure 2:
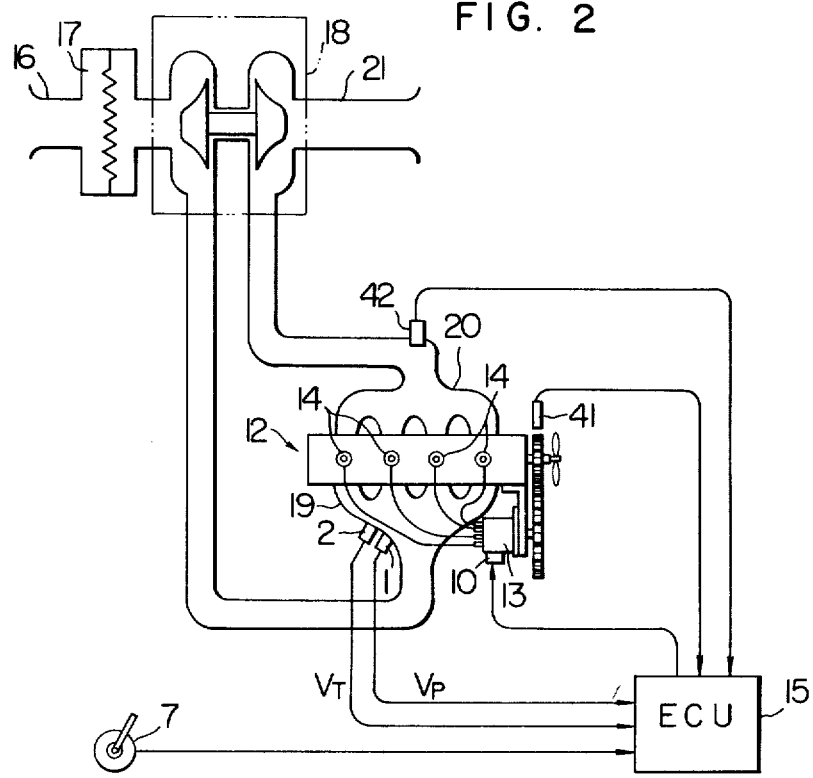
FIG. 2 is a schematic diagram showing the construction of a supercharged Diesel engine incorporating the apparatus shown in FIG. 1.

FIG. 2 is a schematic diagram showing the construction of a supecharged Diesel engine incorporating the apparatus shown in FIG. 1, and the intake air to a Diesel engine 12 is drawn from an intake port 16 through an air cleaner 17 into the compresser of an exhaust turbo supercharger 18 which in turn compresses and delivers the air to an intake manifold 19. The exhaust gases are introduced through an exhaust manifold 20 into the exhaust turbine of the exhaust turbo supercharger 18 so that the exhaust energy is recovered as a compressor driving force and the gases are discharged from a tail pipe 21. The fuel for the engine 12 is distributed under pressure by a distributor type injection pump 13 which is driven by means of the timing gear and the fuel is injected through nozzles 14 mounted for the respective cylinders. The intake pressure sensor 1 and the intake temperature sensor 2 which are disposed in the intake manifold 19 of the engine 12 respectively generate an intake pressure signal $V_p$ and an intake temperature signal $V_T$ respectively corresponding to the absolute pressure and the temperature of the intake air. The engine speed sensor 41 generates a pulse signal for every crankshaft rotation of a predetermined angle. The accelerator position sensor 7 comprises a potentiometer operatively associated with the accelerator pedal of the engine so as to generate a signal corresponding to the amount of movement of the accelerator pedal by the driver. The electric computing means or ECU 15 detects the engine operating condition from the detection signals from the respective sensors so that a target injection amount signal indicative of the target injection amount of fuel to be injected to the engine is generated and the electric servo device 10 controls the position of the injection amount adjusting member 11 in accordance with the signal as the target value.

Figure 3:
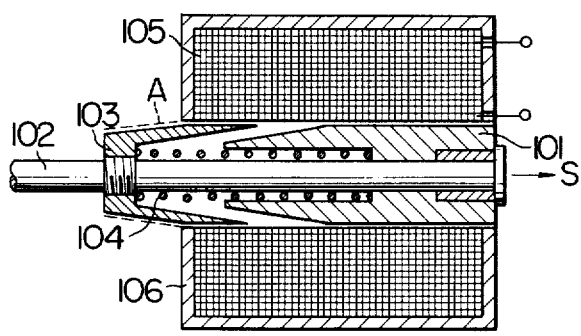
FIG. 3 shows an exemplary form of the electric servo device shown in FIG. 1.
Figure 4:
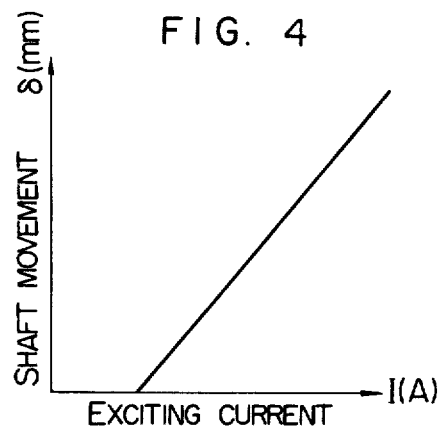
FIG. 4 is a characteristic diagram of the device shown in FIG. 3.

FIG. 3 shows by way of example a linear solenoid forming the electric servo device 10 for actuating the injection pump injection amount adjusting means 11. The linear solenoid includes a moving core 103 fixedly mounted on a shaft 102 which is movable in the direction of an arrow S through the central portion of a stationary core 101, and a return spring 104 applies a restoring force to the moving core 103 in a direction opposite to the arrow S. A solenoid coil 105 is concentrically wound on the stationary core 101 so that when an exciting current is supplied to the coil 105, an electromagnetic attraction is produced between the stationary core 101 and the moving core 103, and the position of the moving core 103 and hence the position of the shaft 102 is determined in accordance with the balancing with the return spring 104. In this case, in order to improve the linearity in the amount of movement of the moving core 103 with respect to the value of the exciting current, the moving core 103 is tapered at its dotted portion A and the tapered portion A is formed into such a shape that the gap between the moving core tapered portion A and a yoke 106 which forms a magnetic path in cooperation with the stationary core 101 increases with a decrease in the gap between the stationary core 101 and the moving core 103. The shaft 102 is coupled to the injection amount adjusting member 11 of the injection pump so as to actuate it. FIG. 4 shows the relationship between the exciting current I supplied to the solenoid coil 105 and the amount of movement of the injection amount adjusting member 11 coupled to the shaft 102. In the Figure, the abscissa represents the exciting current I (A) and the ordinate represents the shaft movement (mm).

Figure 5:
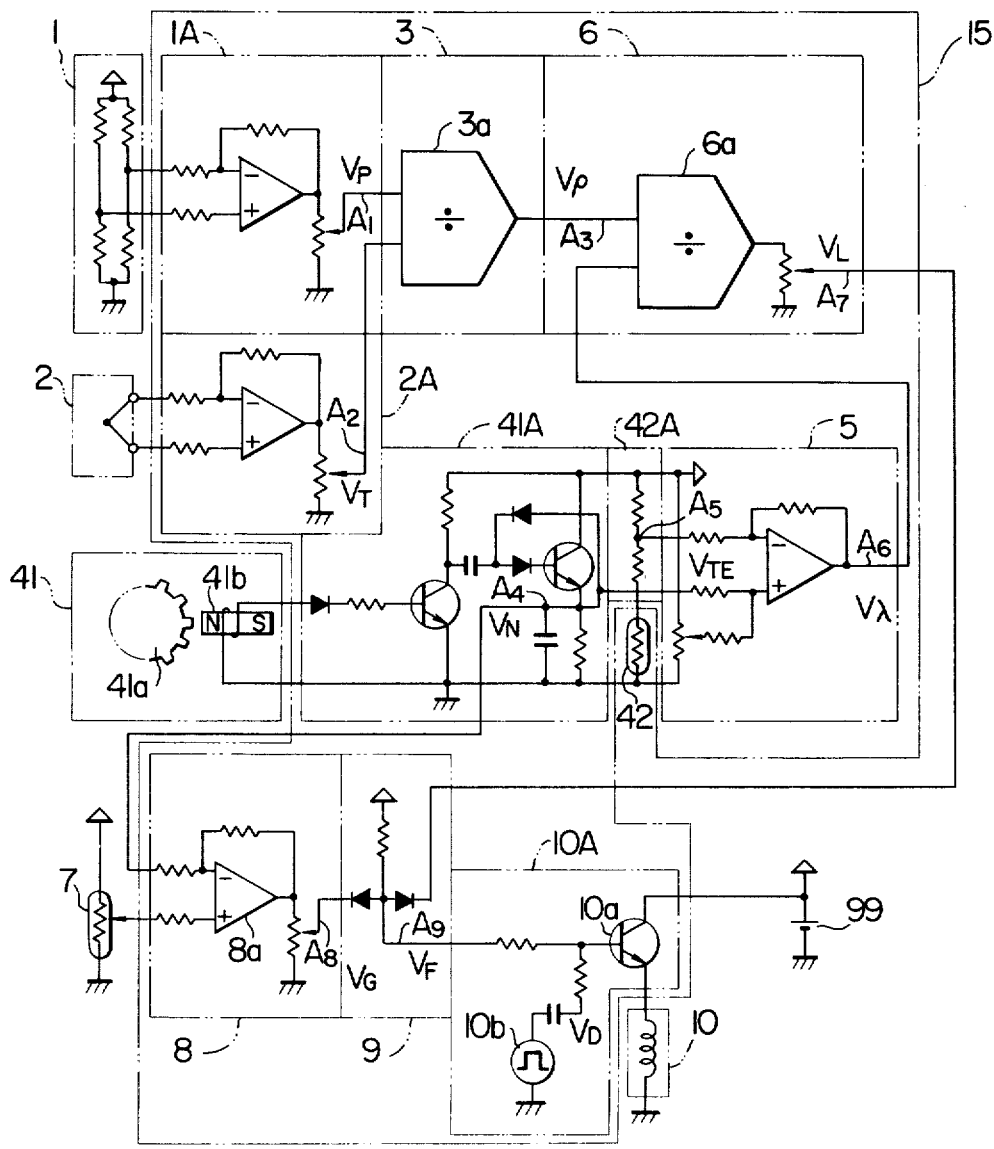
FIG. 5 is a circuit diagram for the electric computing means shown in FIG. 2.

FIG. 5 is a circuit diagram of the embodiment including the electric computing means 15 which in this embodiment comprises an analog type computing circuity. In the Figure, numeral 1 designates an intake pressure sensor for sensing the intake manifold absolute pressure, which may for example be comprised of a semiconductor strain gage type pressure sensor. Numeral 1A designates an amplifier for amplifying the signal from the intake pressure sensor 1 so as to generate at a point $A_1$ a pressure signal $V_p$ indicative of the intake manifold absolute pressure Pi. Numeral 2 designates an intake temperature sensor for sensing the temperature of the air in the intake manifold, which may for example be comprised of a thermocouple type temperature sensor. Numeral 2A designates an amplifier for amplifying the output signal of the temperature sensor 2 so as to generate at a point $A_2$ a temperature signal $V_T$ indicative of the temperature T of the air in the intake manifold. Numeral 3 designates intake density computing means which in this embodiment includes an analog type divider 3a for dividing the pressure signal $V_p$ by the temperature signal $V_T$ so as to generate at a point $A_3$ an intake density signal $V_\rho$ which is indicative of the intake density $\rho$ in the intake manifold and given by the following equation $$V_\rho = k_\rho \cdot V_p / V_T \qquad (1)$$

where $k_\rho$ is a constant.

In this embodiment, an engine speed N and an exhaust temperature $T_E$ are used to represent the engine operating condition for determining an air-excess ratio $\lambda$. Numeral 41 designates an engine speed sensor which in this embodiment comprises an inductor 41a operatively associated with the engine crankshaft and an electromagnetic pickup 41b for sensing the rotation of the inductor 41a whereby a pulse signal having a repetition frequency proportional to the engine speed is applied to a frequency-to-voltage converter 41A which in turn generates at a point $A_4$ an engine speed signal $V_N$ proportional to the engine speed. Numeral 42 designates an exhaust temperature sensor for sensing the engine exhaust temperature, which may for example be comprised of a thermistor type temperature responsive element. Numeral 42A designates a half-bridge circuit including the temperature responsive element 42, which generates at a point $A_5$ an exhaust temperature signal $V_{TE}$ corresponding to the exhaust temperature. Numeral 5 designates air-excess ratio computing means which receives the engine speed detection signal $V_N$ and the exhaust temperature detection signal $V_{TE}$ to compute an air-excess ratio $\lambda$ and generate at a point $A_6$ an air-excess ratio signal $V_{80}$ corresponding to the air-excess ratio $\lambda$.

Numeral 6 designates smoke-limit injection amount computing means for computing a smoke-limit injection amount signal $V_L$ from the intake density $V_\rho$ and the air-excess ratio signal $V_\rho$. In this embodiment, an analog type divider 6a divides the intake density signal by the air-excess ratio signal to generate a smoke-limit injection amount signal $V_L$ at a point $A_7$. The smoke-limit injection amount signal $V_L$ is given by $V_L = k_L V_\rho / V_\lambda$. Here, $k_L$ is determined by the engine displacement, the suction efficiency, etc., and it may generally be considered as a constant.

Numeral 7 designates an accelerator position sensor for sensing the amount of movement of the accelerator pedal and it comprises a potentiometer operatively associated with the vehicle accelerator pedal so as to sense the position of the accelerator pedal. Numeral 8 designates part-load injection amount computing means responsive to a change in the position of the accelerator pedal to determine the injection amount corresponding to any given part load, and in this embodiment the computing means 8 includes a differential type operational amplifier 8a which receives the engine speed signal $V_N$ as its inverting input signal and the accelerator position signal from the accelerator position sensor 7 as its noninverting input signal to thereby generate a part-load injection amount signal $V_G$ at a point $A_8$.

Numeral 9 designates target injection amount computing means responsive to the part-load injection amount signal $V_G$ and the smoke-limit injection amount signal $V_L$ to generate a target injection amount signal $V_F$ corresponding to the final target value for the injection amount. Numeral 10A designates a drive circuit for an electric servo device 10, which is responsive to the target injection amount signal $V_F$ to actuate an injection amount adjusting member 11 of the injection pump. The drive circuit 10A includes a transistor 10a for subjecting the target injection amount signal $V_F$ to current amplification so as to actuate the electric servo device or linear solenoid 10. In order to improve the hysteresis characteristic of the actuation force applied to the linear solenoid 10, a rectangular oscillator 10b generates a rectangular AC signal which is superposed as a dither signal $V_D$ on the target injection amount signal $V_F$ so as to accomplish the positioning control with an improved reproducibility.

Figure 6:
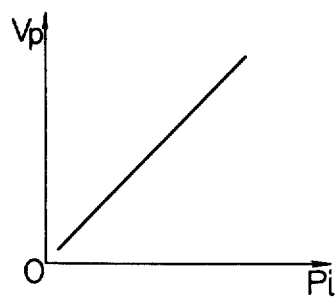
FIGS. 6, 7, 8, 9, 10, 11, 12, 13A, 13B and 14 are characteristic diagrams useful for explaining the operation of the apparatus shown in FIG. 1.
Figure 7:
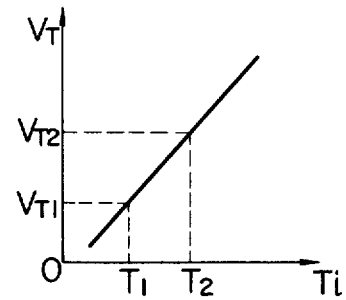
Figure 8:
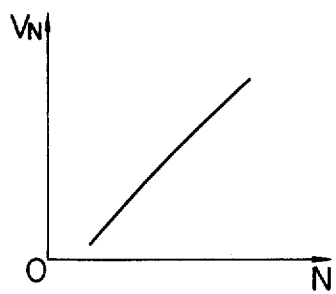
Figure 9:
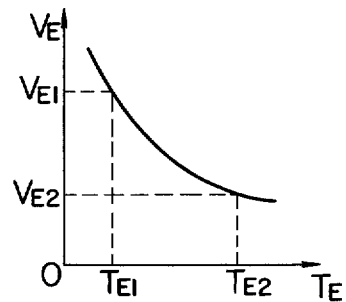
Figure 10:
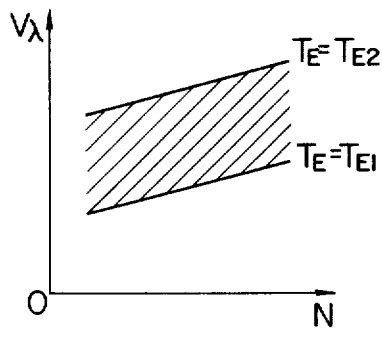
Figure 11:
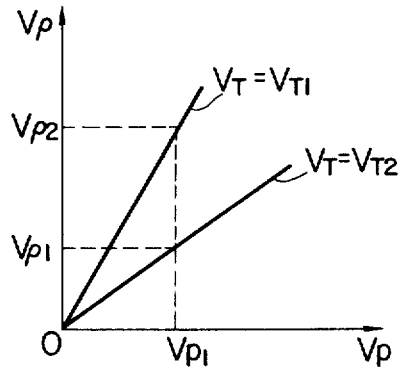

With the construction described above, the operation of the apparatus will now be described. The absolute pressure Pi and the temperature Ti of the engine intake manifold are respectively sensed by the intake pressure sensor 1 and the intake temperature sensor 2 and then amplified by the amplifiers 1A and 2A thus generating an intake pressure signal $V_p$ and an intake temperature signal $V_T$. The characteristics of these signals are shown in FIGS. 6 and 7, respectively. The intake density computing means 3 computes an intake density signal $V_\rho = k_\rho V_p / V_T$ providing the characteristics shown in FIG. 11. In the Figure, the characteristics $V_T = V_{T1}$ and $V_T = V_{T2}$ respectively correspond to the low and high intake temperature conditions. For example, if $V_p = V_{p1}$, then the density signal $V_\rho$ becomes $V_{\rho 2}$ and $V_{\rho 1}$, respectively. In addition, the rotational speed of the engine is sensed by the engine speed sensor 41 which in turn generates an engine speed signal $V_N$ which is proportional to the engine speed N as shown in FIG. 8, and the exhaust temperature sensor 42 senses the exhaust temperature $T_E$ to generate an exhaust temperature signal $V_E$ as shown in FIG. 9. The air-excess ratio computing means 5 performs an arithmetic operation on the engine speed signal $V_N$ and the exhaust temperature signal $V_E$ to generate an air-excess ratio signal $V_\lambda$ having a functional pattern as shown in FIG. 10. In the Figure, $T_E = T_{E1}$ represents the case where the exhaust temperature is relatively low and $T_E = T_{E2}$ represents the case where the exhaust temperature is relatively high. For the exhaust temperatures intermediate between these two values, the characteristic becomes as shown by the hatched portion. The intake density signal $V_\rho$ is divided by the air-excess ratio signal $V_\lambda$ in the smoke-limit injection amount computing means 6, thus generating a smoke-limit injection amount signal $V_L$.

Figure 12:
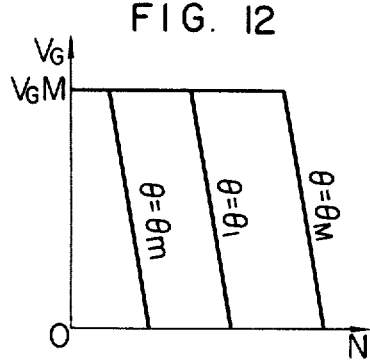
Figure 14:
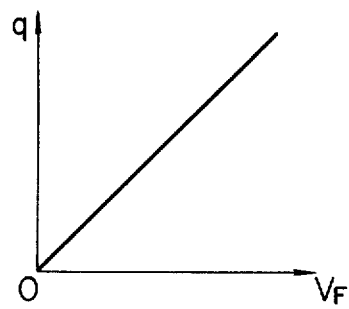
Figure 13A:
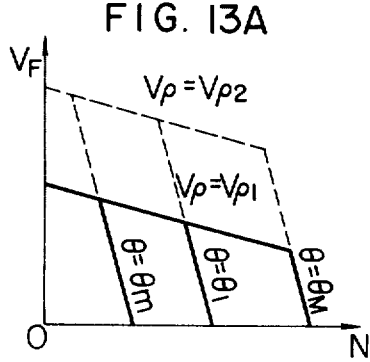
Figure 13B:
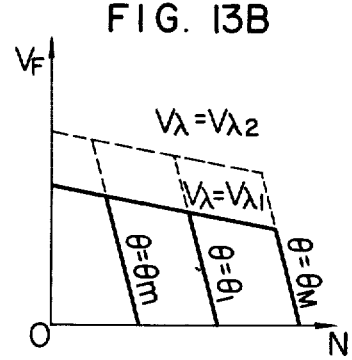

In response to the accelerator position $\theta$ provided by the driver the part-load injection amount computing means 8 generates a part-load injection smount signal $V_G$ in accordance with the engine speed N as shown in FIG. 12. In the Figure, $\theta = \theta_m$ represents the minimum throttle opening and $\theta = \theta_M$ represents the maximum throttle opening, with $\theta_m < \theta_1 < \theta_M$. The maximum value $V_{GM}$ of the part-load injection amount signal $V_G$ is $V_{GM} \geq V_L$. The lower one of the smoke-limit injection amount signal $V_L$ and the part-load injection amount signal $V_G$ is selected by the target injection amount computing means 9 as a target injection amount signal $V_F$ and the desired target injection amount signal is determined in accordance with the functional patterns of FIGS. 13A and 13B. FIG. 13A shows the functional relation using the intake density $\rho$ as a parameter and FIG. 13B shows the functional relation using the air-excess ratio $\lambda$ as a parameter. Using this target injection amount signal $V_F$ as the desired amount, the linear solenoid 10 actuates the injection amount adjusting member 11 to determine the injection amount q of the injection pump. FIG. 14 shows this relation and the injection amount q varies in proportion to the target injection amount signal $V_F$.

As a result, the injection amount of the injection pump is controlled so as to compensate for variations in the intake density and thus the desired air-excess ratio is provided in accordance with variations in a wide range of operating conditions, preventing the emission of smoke in the exhaust gases and also making full use of the supercharging effect with the resulting increase in the power output. The Teledyne model 4450 connected to function as a divider may be used for each of the analog type dividers 3a and 6a shown in FIG. 5.

Figure 15:
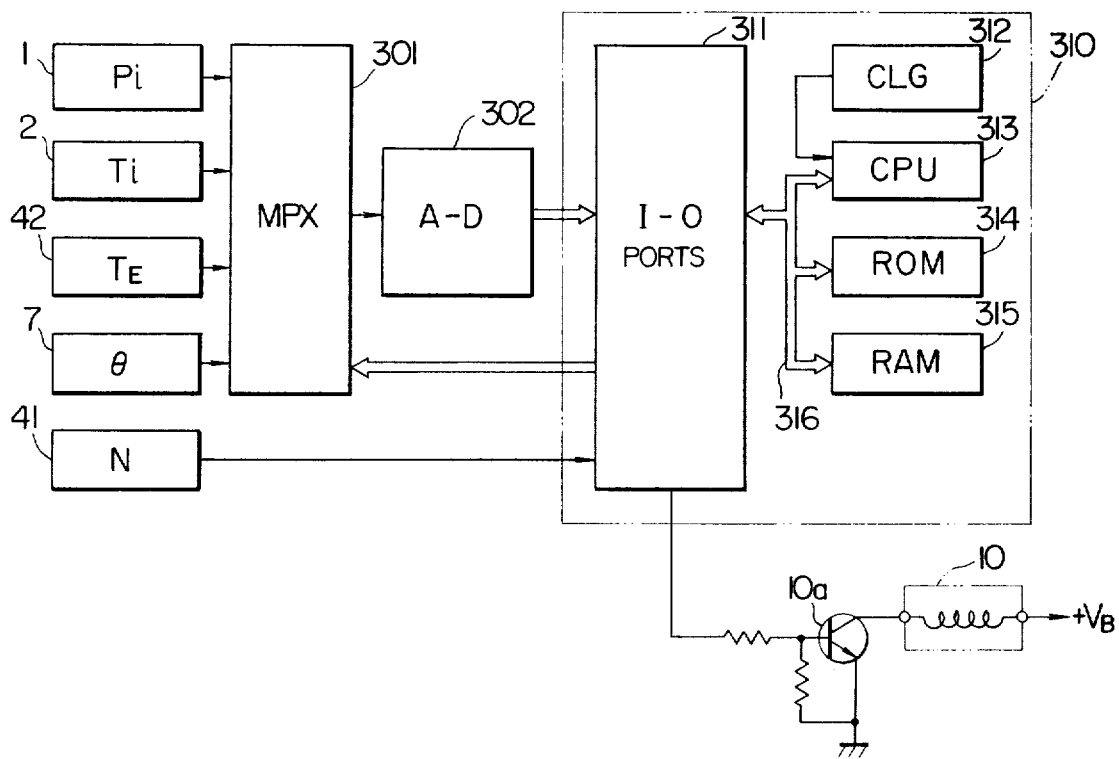
FIG. 15 is a block diagram showing another embodiment of the invention.

Another embodiment of the invention will now be described. FIG. 15 shows a digital type electric computing means comprising a microcomputer, which is used in this embodiment in place of the previously mentioned analog type electric computing means 15. In the Figure, numeral 1 designates an intake pressure sensor for sensing the intake manifold pressure, 2 an intake temperature sensor, 42 an exhaust temperature sensor, and 7 an accelerator position sensor. These sensors are identical in construction with their counterparts shown in FIG. 5 and they generate analog detection signals. A multiplexer 301 selects the desired sensor and its detection signal is converted to a digital signal in binary form by an A/D converter 302. Numeral 310 designates a single-chip microcomputer in which the detection signals applied from the A/D converter 302 are received by input/output (I/O) ports 311 and applied through a bus line 316 to a central processing unit or CPU 313 which operates on the signals. The CPU 313 is also connected through the bus line 316 to a read-only memory or ROM 314 and an random-access memory or RAM 315 and to a clock generating circuit or CLG 312 which supplies clocks to the CPU 313 to actuate it. The detection data applied through the I/O ports 311 and the computational results of the CPU 313 are temporarily stored in the RAM 315. The necessary computational program and constants are stored in the ROM 314. In accordance with the computational program in the ROM 314 the CPU 313 computes a target injection amount from the data supplied by way of the I/O ports 311 and the result obtained is converted to a target pulse width signal by the preset counter in the I/O ports 311. The thusly produced target pulse width signal is amplified by a drive transistor 10a for a linear solenoid 10 and then applied to the linear solenoid 10 which in turn actuates an injection amount adjusting member 11 for the injection pump to thereby control the amount of fuel injected.

Figure 16:
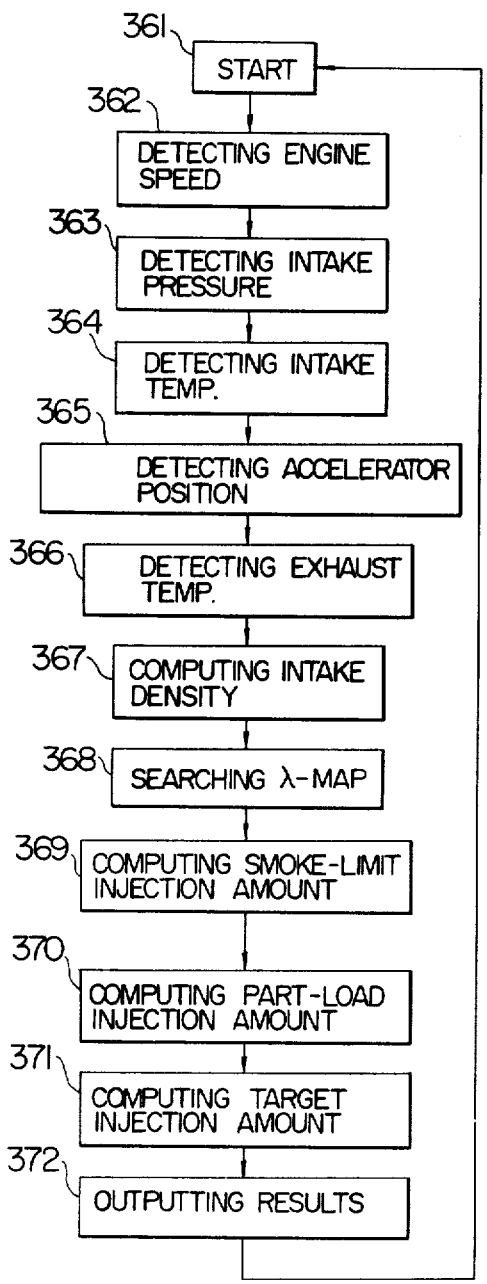
FIG. 16 is a flow chart showing the sequence of the computational operations performed by the apparatus shown in FIG. 15.
Figure 17:
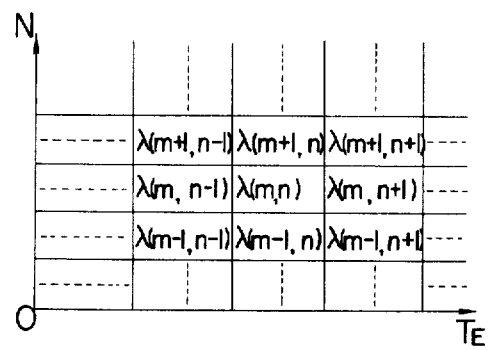
FIG. 17 is a diagram for explaining an air-excess ratio map.

FIG. 16 shows a flow chart for the computational program of the microcomputer 310. When the key switch is closed so that the control is transferred to a starting step 361, the detection signals from the intake manifold intake pressure sensor 1, the intake temperature sensor 2, the exhaust temperature sensor 42 and the accelerator position sensor 7 are detected by the corresponding detection steps 363 to 366 so that the signals are read into the microcomputer 310 through the multiplexer 301 and the A/D converter 302 and the signals are temporarily stored in the RAM 315. The engine speed is detected by a step 362 so that it is converted to a digital signal through the counter incorporated in the I/O ports 311 and the signal is stored in the RAM 315. Then, a step 367 computes from the intake pressure Pi and the intake temperature Ti an intake density $\rho = k_1 Pi/Ti$ (where $k_1$ is a constant) and stores the resulting intake density data in the RAM 315. The next step 368 searches, in accordance with the exhaust temperature $T_E$ and the engine speed N, the corresponding air-excess ratio $\rho(m,n)$ from the air-excess ratio map (FIG. 17) in the ROM 314 and stores it in the RAM 315. The next step 369 computes, from the intake density $\rho$ and the air-excess ratio $\lambda(m,n)$, a smoke-limit injection amount $q_L = k'_L \rho / \lambda(m,n)$ and stores it in the RAM 315. The next step 370 computes, from the engine speed N and the accelerator position $\theta$, a part-load injection amount $q_p = k_2\theta - k_3 N$ (where $k_2$ and $k_3$ are constants) and stores the resulting part-load injection amount $q_p$ in RAM 315. The next step 371 compares the smoke-limit injection amount $q_L$ with the part-load injection amount $q_p$ so that the smaller one of the two data is selected as a target injection amount $q_F$. The next step 372 supplies the result to the I/O ports 311 and presets the same into the preset count incorporated therein. Thereafter, the corresponding number of clock pulses are counted and converted to a drive pulse having a pulse width proportional to the target injection amount, thus energizing the linear solenoid 10 and thereby actuating the injection amount adjusting member for the injection pump 11 to control the fuel injection amount. When the step 372 is completed, the control is returned to the starting step 361 and the similar computational operations are repeated to control the injection amount.

We claim:

1. An electric control apparatus for a fuel injection pump of a Diesel engine having a supercharger, comprising:
    an intake pressure sensor for sensing a pressure in an intake manifold of said engine;
    an intake temperature sensor for sensing a temperature in said engine intake manifold;
    means connected to said sensors such that a detection value of said intake pressure sensor is divided by a detection value of said intake temperature sensor to thereby compute an intake density;
    operating condition sensing means for sensing an operating condition of said engine;
    means connected to said operating condition sensing means to compute an air-excess ratio from detection signals generated by said operating condition sensing means; and
    means connected to said intake density computing means and said air-excess ratio computing means such that a smoke-limit injection amount to said engine is controlled in accordance with a signal from said intake density computing means which is indicative of intake density and a signal from said air-excess ratio computing means which is indicative of air-excess ratio.

2. An electric control apparatus for a fuel injection pump of a Diesel engine having a supercharger, comprising:

an intake pressure sensor for sensing a pressure in an intake manifold of said engine;

an intake temperature sensor for sensing a temperature in said engine intake manifold;

an engine speed sensor for sensing a rotational speed of said engine;

an exhaust temperature sensor for sensing a temperature in an exhaust pipe of said engine;

an accelerator position sensor for sensing a position of accelerator means of said engine;

means connected to said intake pressure sensor and said intake temperature sensor such that an output signal of said intake pressure sensor which is indicative of intake pressure is divided by an output signal of said intake temperature sensor which is indicative of intake temperature to thereby compute an intake density;

means connected to said engine speed sensor and said exhaust temperature sensor such that an air-excess ratio is computed from an output signal of said engine speed sensor which is indicative of engine speed and an output signal of said exhaust temperature sensor which is indicative of exhaust temperature;

means connected to said intake density computing means and said air-excess ratio computing means such that an output signal of said intake density computing means which is indicative of intake density is divided by an output signal of said air-excess ratio computing means which is indicative of air-excess ratio to thereby compute a smoke-limit injection amount;

means connected to said engine speed sensor and said accelerator position sensor such that a fuel injection amount corresponding to a part-load condition of said engine is computed in accordance with said output signal indicative of engine speed and an output signal of said accelerator position sensor which is indicative of an operated position of said accelerator means;

target injection amount computing means connected to said smoke-limit injection amount computing means and said part-load injection amount computing means for selecting the smaller one of an output signal of said smoke-limit injection amount computing means which is indicative of smoke-limit injection amount and an output signal of said part-load injection amount computing means which is indicative of part-load injection amount;

an electric servo device including a linear solenoid connected to said target injection amount computing means; and means connected to said electric servo device to adjust the amount of fuel injected by said fuel injection pump of said engine.

3. An electric control apparatus for a fuel injection pump of a Diesel engine have a supercharger, comprising:

an intake pressure sensor for sensing a pressure in an intake manifold of said engine;

an intake temperature sensor for sensing a temperature in said engine intake manifold;

means connected to said sensors such that a detected value of said intake pressure sensor is divided by a detected value of said intake temperature sensor to thereby compute an intake density;

operating condition sensing means for sensing an accelerator position, engine speed and exhaust temperature of said engine;

means connected to said operating condition sensing means to compute an air-excess ratio from said sensed exhaust temperature and engine speed;

means connected to said intake density computing means and said air-excess ratio computing means to compute a smoke-limit injection amount by dividing a signal from said intake density computing means which is indicative of intake density by a signal from said air-excess ratio computing means which is indicative of air-excess ratio;

means connected to said operating condition sensing means to compute a part-load injection amount from said sensed engine speed and accelerator position; and target injection amount computing means connected to said smoke-limit injection amount computing means and part-load injection amount computing means to compute a control signal for controlling the amount of fuel delivered to said engine.

4. An electric control apparatus according to claim 3 including a fuel injection pump having an adjustable member for controlling the fuel injection amount of said fuel injection pump and further including a servo means for determining the position of the injection amount adjustable member in accordance with the control signal.

5. An electric control apparatus for a fuel injection pump of a Diesel engine having a supercharger, comprising:

an intake pressure sensor for sensing a pressure in an intake manifold of said engine;

an intake temperature sensor for sensing a temperature in said engine intake manifold;

an engine speed sensor for sensing a rotational speed of said engine;

an exhaust temperature sensor for sensing a temperature in an exhaust pipe of said engine;

an accelerator position sensor for sensing a position of accelerator means of said engine;

an multiplexor for receiving output signals from said intake pressure sensor, intake temperature sensor, exhaust temperature sensor and accelerator position sensor, respectively;

an analog-to-digital converter for effecting analog-to-digital conversion of output signals of said multiplexor;

input/output port means for receiving output signals of said analog-to-digital converter and an output signal from said speed sensor;

a central processing unit including a random access memory and a read only memory for effecting computation in accordance with signals from said input/output port means, said central processing unit operating in accordance with a program stored in said read only memory for, computing and producing a signal indicative of an intake density by dividing the intake pressure signal by the intake temperature signal, producing a signal indicative of an air-excess ratio in accordance with the engine speed signal and the exhaust temperature signal, computing and producing a signal indicative of a smoke-limit injection amount by dividing the intake density signal by the air-excess ratio signal, producing a signal indicative of a part-load fuel injection amount in accordance with the accelerator position signal and the engine speed signal, and selecting a signal indicative of a smaller fuel injection amount between the smoke-limit injection amount signal and the part-load fuel injection amount signal;

a fuel injection pump having an adjustable member for controlling the fuel injection amount of said fuel injection pump; and servo means for determining the position of the injection amount adjustable member in accordance with the selected smaller fuel injection amount signal.

6. An electric control apparatus according to claims 3, 4 or 5, wherein the means producing the signal indicative of an air-excess ratio produces an air-excess ratio signal which increases linearly with an increase of the rotational speed of said engine.

7. An electric control apparatus according to claim 5, wherein the production of the air-excess ratio signal comprises selecting data from a map of air-excess ratios stored primarily in the read only memory in accordance with the values of the engine speed and the exhaust temperature in said map.

* * * * *